United States Patent [19]

Greer

[11] Patent Number: 4,494,196

[45] Date of Patent: Jan. 15, 1985

[54] CONTROLLER FOR PERIPHERAL DATA STORAGE UNITS

[75] Inventor: Michael T. Greer, North Andover, Mass.

[73] Assignee: Wang Laboratories, Inc., Lowell, Mass.

[21] Appl. No.: 530,191

[22] Filed: Sep. 7, 1983

Related U.S. Application Data

[63] Continuation of Ser. No. 265,257, May 19, 1981, abandoned.

[51] Int. Cl.³ .............................................. G06F 3/00
[52] U.S. Cl. .................................................... 364/200
[58] Field of Search ... 364/200 MS File, 900 MS File; 340/825.03, 825.06, 825.07, 825.08, 825.15, 825.22

[56] References Cited

U.S. PATENT DOCUMENTS

| | | | |
|---|---|---|---|
| 3,846,765 | 11/1974 | De Vries | 365/222 |
| 4,101,969 | 7/1978 | Lawson | 364/900 |
| 4,133,030 | 1/1979 | Huettner | 364/200 |
| 4,254,462 | 3/1981 | Raymond | 364/200 |
| 4,281,315 | 7/1981 | Bauer | 364/200 |

OTHER PUBLICATIONS

K. Deemer, "DCD880 A Floppy/Winchester Marriage", Mini-Micro Systems.

*Primary Examiner*—James D. Thomas
*Assistant Examiner*—David Y. Eng
*Attorney, Agent, or Firm*—Michael H. Shanahan

[57] ABSTRACT

For use in data processing systems, an improved controller to control a plurality of peripheral data storage means having different characteristic data transfer rates. The controller has a similar plurality of instruction storage units, a single instruction register, and common operating circuitry for the data storage means. The controller responds to data transfer commands from the system central processor to select an instruction storage unit, and to the characteristic data transfer rate of a selected data storage means sequentially to address instructions within it, at a rate corresponding with the characteristic data transfer rate. The addressed instructions are sequentially output to the instruction register; the common operating circuitry is responsive to the outputs of the instruction register to transfer data as commanded by the central processor.

3 Claims, 12 Drawing Figures

CONTROLLER FOR PERIPHERAL DATA STORAGE UNITS

This application is a continuation of application Ser. No. 265,257, filed 5/19/81, now abandoned.

This invention relates to controllers for peripheral date storage means in data processing systems, and in particular, to improvements in controllers for controlling a plurality of disks and other data storage means having different data transfer rates.

BACKGROUND OF THE INVENTION

A small computer system, such as a business machine, usually has a central processor unit, a terminal (for input), a printer (for output), and one or more peripheral data storage units such as a disk. In general business use, to avoid accidental loss of important current operating data, it is important to provide backup for the storage. For this purpose, most business users routinely, such as once a day, copy the storage contents onto a removable medium and put it away for safekeeping.

With the recent availability of the small Winchester (fixed) disk, designers of small business computer systems have wanted to move to this disk as the principal data storage medium for the system. Winchester disks are cheaper, faster, more reliable, and have more capacity than previously used disks. However, since the Winchester is a fixed disk, it is not removable from the system. Therefore, removable backup storage must be provided.

One solution is to combine an 8-inch Winchester fixed disk with an 8-inch floppy disk. This floppy disk can be used for backup, and removed for safekeeping; it is convenient to store.

A control unit or interface is generally provided between the central processor and data storage means of small computer systems. The control unit, generally incorporating a microprocessor, performs managerial functions connected with reading and writing the disk, and frees the central processor from responsibility for such tasks. When a single data storage means is used, the controller can be designed to be suitable to that storage means and to operate it efficiently.

However, when two data storage means of different characteristics, such as a fixed disk and a floppy disk, are to be controlled together, a different problem arises. To provide two separately operating controllers, each dedicated to its particular disk, is obviously both cumbersome and expensive. It would therefore be desirable to provide a single controller between the central processor and both disks, employing at least some common circuitry. A single controller would require fewer chips than would two interfaces, and would therefore be less expensive.

However, the differences between the two kinds of disk are so great as to make the design of a common controller a difficult matter. A fixed Winchester disk and a floppy backup disk transfer data signals at quite different rates. A fixed Winchester disk has a transfer rate of from three to eight million bytes per second; a dual-sided double-density floppy disk has a transfer rate of 500 kilobytes per second; and a single density floppy disk has a transfer rate of 250 kilobytes per second. Fixed and floppy disks also require different controller architectures to perform different read, write and format operations; additional differences are entailed if there is a need to provide both single-density and double-density capabilities for the floppy disk.

If all the operations appropriate to each disk are separately provided for, by providing dedicated circuitry, the controller will be expensive. There will also be more opportunities for components to fail. It is therefore desirable to provide for operation of the different disks and modes of operation with as much common circuitry as possible. On the other hand, if a single microprocessor is employed, programmed to provide the various modes of operation, the limitation of the speed of execution of the program will severely limit the speed capability of the controller. Such a controller will be unable to operate some of the fastest disks. In addition, the complexity of programming required will in practice limit the number of peripheral storage means that can be controlled by a single controller using a programmed microprocessor.

Moreover, it may be desirable to change the particular disks or other data storage means employed with a particular data processing system and controller, and it is obviously desirable to provide a controller that is flexible enough to be used with other data storage means, and that is easily adapted to be so used. If large amounts of dedicated circuitry must be changed to accommodate new data storage means, it will be a difficult task to adapt the controller. On the other hand, it will also be very difficult to adapt a controller employing a programmed microprocessor, because the program is complex and rewriting it is a time-consuming task.

An example of a prior art controller intended to control a Winchester fixed disk and a floppy disk is the "DSD 880", made by Data Systems Design, Inc., and described in an article in the September 1980 issue of the magazine *Mini Micro Systems*, published by Cahners Publishing Co.

This controller employs a programmed bit-slice microprocessor, However, this controller is designed to control two peripheral data storage units, a fixed and a floppy disk, and to modify it to control additional units would be very difficult. Any such modification would add greatly to the complexity of the program, so that in practice this controller is limited to two or three controlled devices. Similarly, to change one of the controlled devices to another type of device would also call for major reprogramming and would be a difficult adaptation. The top speed of the controller is limited by the rate at which the microprocessor can execute its instructions, which is in practice very close to the speed of current fixed disks. Any future disk having a somewhat increased rate of data transfer would not be usable with this controller.

It is therefore an object of this invention to provide a single device that can interface between the central processor of a data processing system and a plurality of data storage means having different data transfer rates and different control operations.

It is also an object of the invention to provide such a controller that is capable of controlling data storage means having extremely fast data transfer.

It is a further object of the invention to provide such a single device that is quickly and easily adaptable to interface to a different plurality of data storage means, or to data storage means having different modes of operation.

It is another object of the invention to provide such a device that uses a minimum of circuit elements, and is therefore economical to manufacture, and simple and reliable in operation.

According to the invention, an improved controller is provided in a data processing system of the kind having a central processing unit and a plurality of peripheral data storage units. Each peripheral data storage unit transfers data signals at a characteristic rate, and the rates are distinct. The central processing unit provides and receives data signals, and provides control signals including data storage unit select, read, write and format control signals.

The controller is connected between the central processing unit and the peripheral data storage units. The controller provides temporary data storage, and is adapted to transfer data signals between the central processing unit and the temporary storage, and between the temporary storage and any of the peripheral data storage units, responsive to the central processing unit control signals.

The controller provides the same number of instruction storage units as there are peripheral data storage units. The controller further provides selection and addressing means connected to the instruction storage units, and a single instruction register, each of the instruction storage units being connected to the instruction register. The controller provides controller timing means, which is responsive to the characteristic data signal transfer rate of a selected peripheral data storage unit to provide controller timing signals corresponding to its transfer rate. The controller selection and addressing means is responsive to the data storage unit select control signal to select one of the instruction storage units, is further responsive to one of the read, write and format control signals to provide initial address signals addressing an initial instruction in said selected instruction storage unit, and is further responsive to the controller timing signals to increment the initial address to provide successively incremented address signals.

The instruction register is responsive to the controller timing signals to be loaded with signals representing the initially addressed instruction of the selected instruction storage unit, and successively with signals representing instructions addressed by the incremented address signals.

The controller further provides common data storage unit operating circuitry connected to the peripheral data storage units, which is responsive to signals output from the instruction register to transfer data signals between a selected peripheral data storage unit and the controller temporary storage as controlled by the central processing unit control signals.

Preferably, the instruction register provides a write mode signal and a read mode signal. The common operating circuitry is responsive to the write mode signal to send data signals to the selected peripheral data storage unit, and responsive to the read mode signal to receive data signals from the selected peripheral data storage unit. The controller timing means comprises means responsive to data signals received from a selected peripheral data storage unit to provide a read mode timing signal, means responsive to the data storage unit select signals to provide a write mode timing signal, and timing signal select means providing a controller timing signal corresponding to the characteristic data transfer rate of a selected peripheral data storage unit. The timing signal select means is responsive to the read mode signal and to the read mode timing signal to provide the read mode timing signal as the controller timing signal, and is responsive to the write mode signal and to the write mode timing signal to provide the write mode timing signal as the controller timing signal.

Each instruction storage unit contains all instructions necessary for the operating circuitry to operate the corresponding peripheral storage unit. The instructions in each portion (read, write or format) of an instruction storage unit are sequentially executable beginning with the initial instruction. The instruction storage units are adapted for easy removal or replacement, so that the controller is adaptable to be connected to a variable plurality of peripheral data storage units by varying the set of instruction storage units.

Other objects, features and advantages will appear from the following description of a preferred embodiment of the invention, taken together with the attached drawings thereof, in which.

DESCRIPTION OF THE DRAWING

Figure 1:
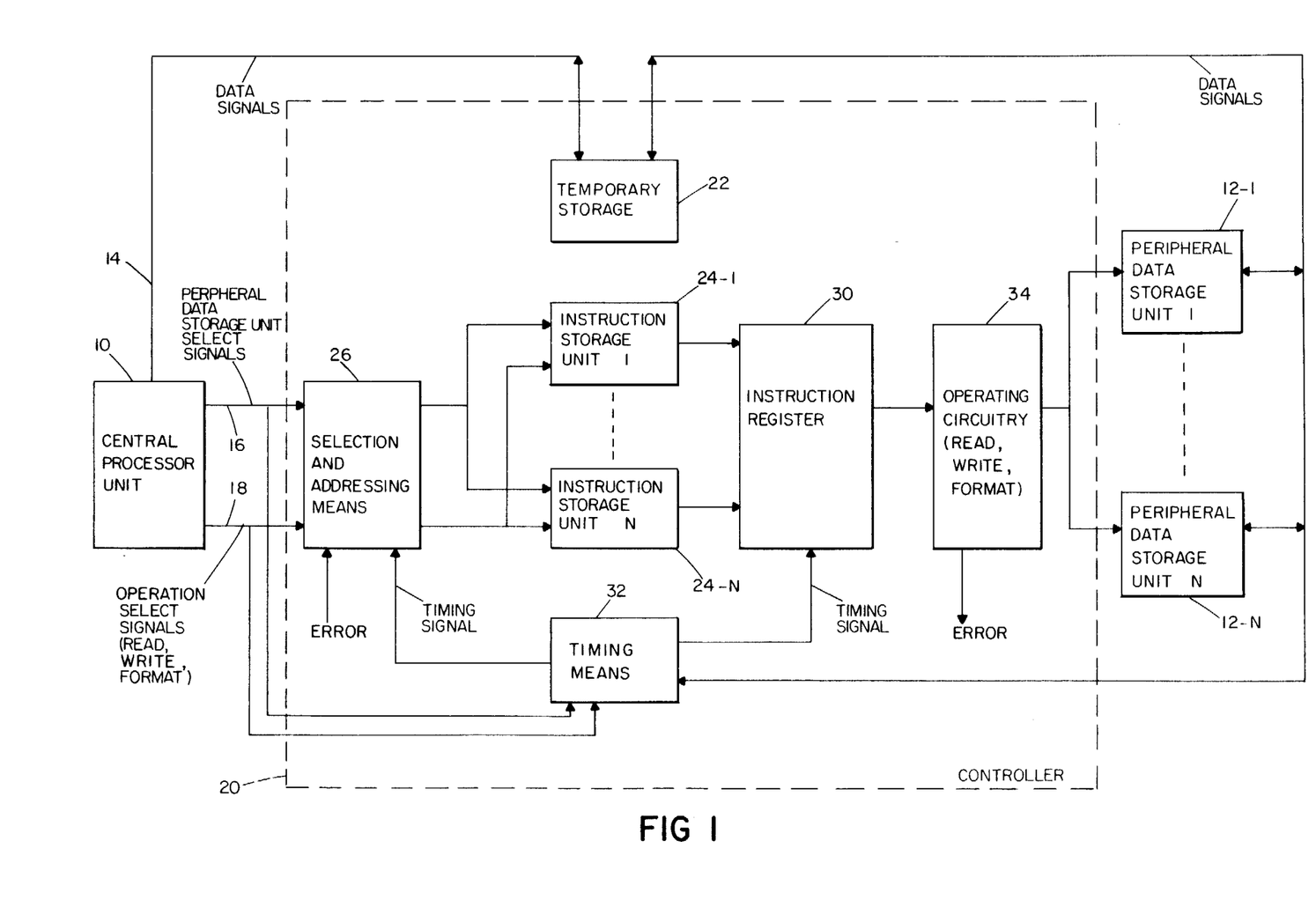
FIG. 1 is a simplified block diagram of a data processing system, including a controller according to the present invention.

Referring now to the drawing, and particularly to FIG. 1, a general data processing system including the controller of the invention has a central processing unit 10 and a plurality of peripheral data storage units 12-1, 12-2, . . . 12-N.

The term "peripheral data storage unit" is intended to be general, and may refer to a fixed disk, a floppy disk, or to any of several other types of peripheral units, such as tape drives, paper tape devices, and industrial control devices. In addition, "peripheral data storage unit" may refer to a separate mode of operation of a physical storage medium.

Figure 6:
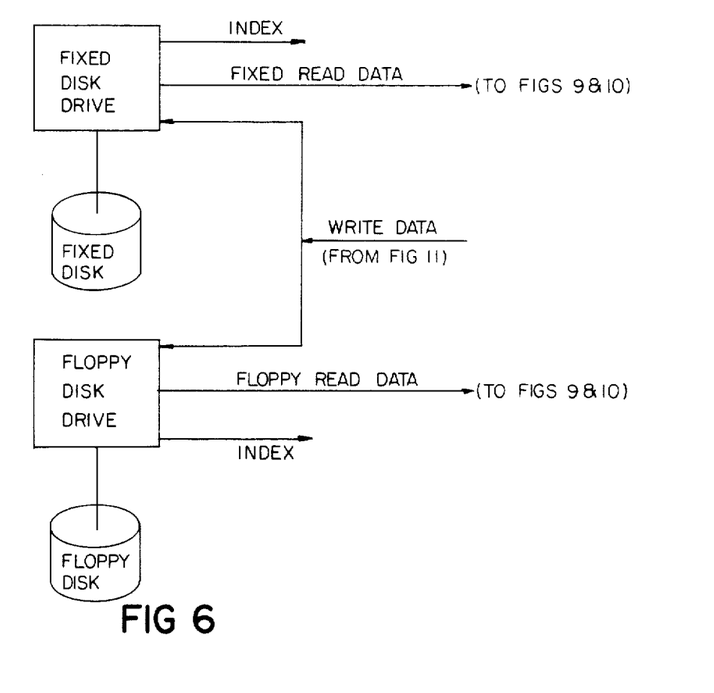
FIG. 6 shows in simplified form the paths of read data signals and index signals from the disks, and the path of write data signals to the disks.

Thus, in the particular embodiment described herein, as is seen in FIG. 6, there are two physical data storage media, specifically an 8-inch Winchester fixed disk, and a floppy disk. However, for reasons of compatibility with equipment of other manufacturers, and for transferability of data to other equipment, the floppy disk is required to be operated in both a double-density and a single-density mode. For purposes of describing the controller of the invention, these two modes are regarded as conceptually equivalent to two separate disks, and are described, in general terms, as separate "peripheral data storage units". Therefore, the specific embodiment of the data processing system described herein is regarded as having three peripheral data storage units although it has only two physical disks.

In every data processing system, each peripheral data storage unit transfers data signals at a characteristic rate, and these rates are generally distinct for the different units. Thus, data signals are transferred at one rate for a fixed (Winchester) disk; and data signals are transferred at different rates for the double-density and single-density modes of operation of the floppy disk. The rate at which operating instructions are accessed and executed to carry out the transfer of data signals between the data storage unit and the rest of the data processing system is also a function of the characteristic data transfer rate of the data storage unit.

Still referring to FIG. 1, central processing unit 10 provides and receives data signals on lines 14, and further provides data transfer control signals including data storage unit select, read, write and format control signals. These control signals are shown conceptually in FIG. 1 as transmitted on lines 16 and 18 separate from the data signals, but in the particular embodiment described herein, the control signals are in fact transmitted on a data bus, and a command strobe signal is separately transmitted to distinguish them as control signals, as will be described in connection with FIG. 2.

A controller 20 is connected between the central processing unit 10 and the peripheral data storage units 12.

The purpose of the controller is to carry out the transfer of data signals between the central processing unit 10 and the peripheral data storage units 12. From the point of view of the central processor, all that need be done to read or write a disk is to output a command or operation select signal (one of Read, Write, or Format), a disk select and sector address signal, and the data signals if the operation is a write. The controller manages the operation.

In a controller of the general type described herein, the operation takes place in two stages. The first stage is independent of the selection of the disk involved in the transfer. If the operation is a write, the command from the central processor causes the controller to store the data signals in local temporary storage. If the operation is a read, the command from the central processor causes the controller immediately to proceed to the second stage.

In the second stage, in the case of a write operation, the controller transfers the data signals from local temporary storage to the selected disk. In the case of a read operation, the controller obtains the data signals from the selected disk and stores them in local temporary storage for later transfer to the central processor.

The present invention is not related to the first part of the operation.

According to the invention, in accomplishing the second stage of the operation, the controller uses the central processor operation and disk select signals to address stored sets of instructions appropriate to the selected disk and operation, and employs the characteristic frequency of the selected disk (or mode of operation of the disk) to address successive instructions and to apply the addressed instructions successively to common disk operating circuitry, which causes the operation to be carried out.

Referring still to FIG. 1, controller 20 provides temporary data storage 22 in the form of a random access memory, and is adapted to transfer data signals between the central processing unit 10 and temporary storage 22, and between temporary storage 22 and any of the peripheral data storage units 12, responsive to the control signals from central processing unit 10.

Controller 20 provides a plurality of instruction storage units 24-1 through 24-N. In any particular embodiment, there are the same number of instruction storage units 24 as there are peripheral data storage units. Thus, in the particular embodiment described herein, there are three instruction storage units, corresponding to fixed disk, single-density floppy disk, and double-density floppy disk, even though there is only one floppy disk. More instruction storage units may be provided if more modes of operation are required or more data storage units are to be operated. Instruction storage units 24 will be described in more detail in connection with FIG. 4.

Controller 20 further provides selection and addressing means 26 connected to all the instruction storage units 24, and a single instruction register 30. Each of the instruction storage units 24-1 . . . 24-N is connected to instruction register 30. Selection and addressing means 26 and instruction register 30 will be described in more detail in connection with FIG. 3.

Controller 20 provides timing means 32 responsive to the characteristic data transfer rate of a peripheral data storage unit 12 to provide controller timing signals corresponding to the rate of transfer.

More specifically, as will be described in more detail, the timing means operates in either of two modes. When data is being read from the peripheral data storage unit, the rate of receiving the data signals determines the characteristic data transfer rate to which the timing means responds; when data is being written to the peripheral data storage unit, the timing means responds to central processor control signals to output an appropriate timing signal corresponding to the characteristic data transfer rate of the selected peripheral data storage unit. The timing means will be described in more detail in connection with FIGS. 7, 8, 9, 10, and 12.

Further, controller 20 provides general data storage unit operating circuitry 34 connected to the peripheral data storage units 12. This circuitry, which is conventional in design and will not be described in detail herein, operates to read, write or format any selected data storage unit 12, as controlled by the outputs of instruction register 30.

The controller selection and addressing means 26 is responsive to the data storage unit select control signal on line 16 from the central processing unit to select one of the instruction storage units 24. The selected instruction storage unit 24 contains stored sets of sequential instructions appropriate to read, write, or format the corresponding peripheral data storage unit 12. Selection and addressing means 26 is further responsive to one of the operation select control signals on line 18 to provide an initial address to the selected instruction storage unit. The initial address is the address of the first instruction in the set appropriate to accomplish either read, write or format of the selected data storage unit. Selection and addressing means 26 responds to further timing signals from timing means 32 to increment the initial address, and thereby to provide successively incremented addresses to the selected instruction storage unit 24.

The instructions within a set (read, write, or format) are sequentially executable beginning with the initial instruction of the set; that is, no decisions or jumps are made. This is because these instructions are presented directly to hard-wired operating circuitry rather than to a microprocessor. The speed of executing the instructions is greater than would be obtainable with a microprocessor.

The addressed first instruction from the selected instruction storage unit 24 is loaded to instruction register 30 responsive to the timing signals from timing means 32. The outputs of instruction register 30 are applied to the general operating circuitry 34, which carries out the selected operation (read, write or format) on the selected peripheral storage unit, to transfer data signals between a selected peripheral data storage unit and the controller temporary storage 22.

Figure 2:
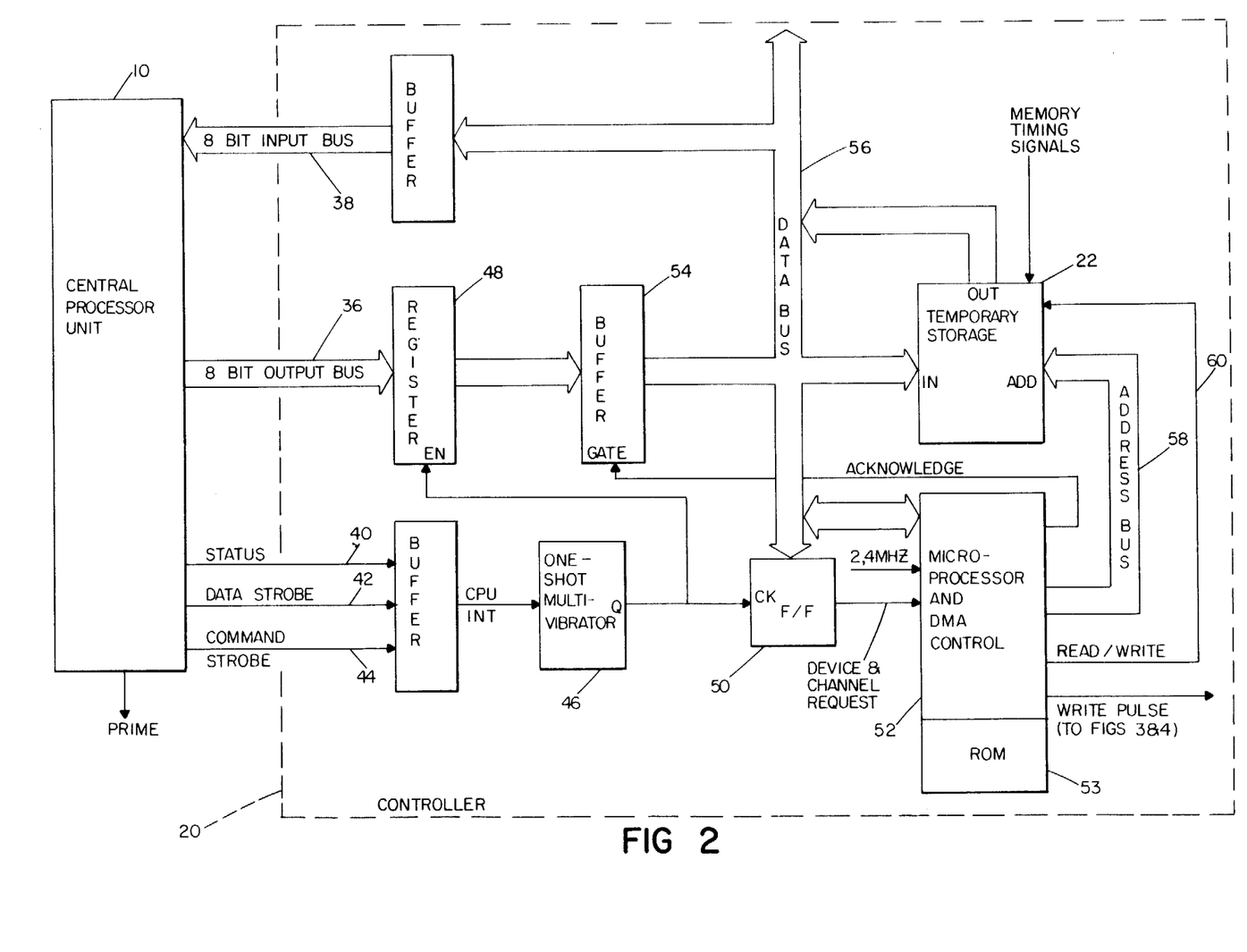
FIG. 2 shows in simplified block diagram form portions of the controller relating to the transfer of data signals between the central processor and the controller.

Referring now to FIG. 2, the means of transferring data signals and control signals between central processor unit 10 and controller 20 are shown in more detail than in FIG. 1, but still schematically, as this portion of the controller is not novel and forms no part of the invention.

Central processor unit 10 is connected to an 8-bit Output Bus 36, to an 8-bit Input Bus 38, and to three control lines, Status (40), Data Strobe (42) and Command Strobe (44). When data is transferred from the CPU 10 to controller 20, it appears on the Output Bus 36, together with a signal on either the Data Strobe line 42 or Command Strobe line 44. Either strobe is applied (renamed CPU Interrupt) to a one-shot multivibrator 46, whose 100 nanosec output enables register 48 to receive the data from bus 36.

The output of multivibrator 46 is also applied to clock flip-flop 50, whose output (Device and Channel Request) is applied to the circuitry 52, which comprises a microprocessor and DMA (Direct Memory Access) control. This circuitry is conventional in nature, and will not be shown in detail herein. In the particular embodiment described herein, the microprocessor is a Zilog Z-80, together with a CTC (Counter Timer Chip), and the DMA control is a 9517 chip of Advanced Micro Devices. A read only memory 53 (ROM) provides appropriate control instructions to circuitry 52. The nature of the control instructions is conventional, and is not pertinent to the present invention and will not be described.

Circuitry 52 is connected to the controller data bus 56, and to an address bus 58. In addition, circuitry 52 generates certain control signals, including Memory Read/Write control signals on line 60, an Acknowledge signal, and various Write Pulses, input to FIGS. 3 and 4. Each Write Pulse is combined with a "port" signal, not shown, designating a particular circuit element within the controller; this causes the Write Pulse to be applied to selected portions of the controller circuitry. The Write Pulses are not described individually herein, the manner of generating and employing them being well known in the art.

Upon receiving a Device and Channel Request signal, circuitry 52, upon reaching a suitable point in its operating cycle, outputs the Acknowledge signal, which gates buffer 54 and thereby places the data signals from the CPU 10 onto the controller data bus 56. Circuitry 52 also provides address signals on address bus 58 to the Temporary Storage (RAM) 22, together with memory read or write control signals on line 60. The data signals supplied from CPU 10 are then stored in temporary storage 22 at a location determined by circuitry 52 in a manner that forms no part of the present invention.

At the next available time, circuitry 52 outputs command signals on data bus 56, together with the Write Pulse (and an appropriate port signal, not shown), to selection and addressing means 26.

Figure 3:
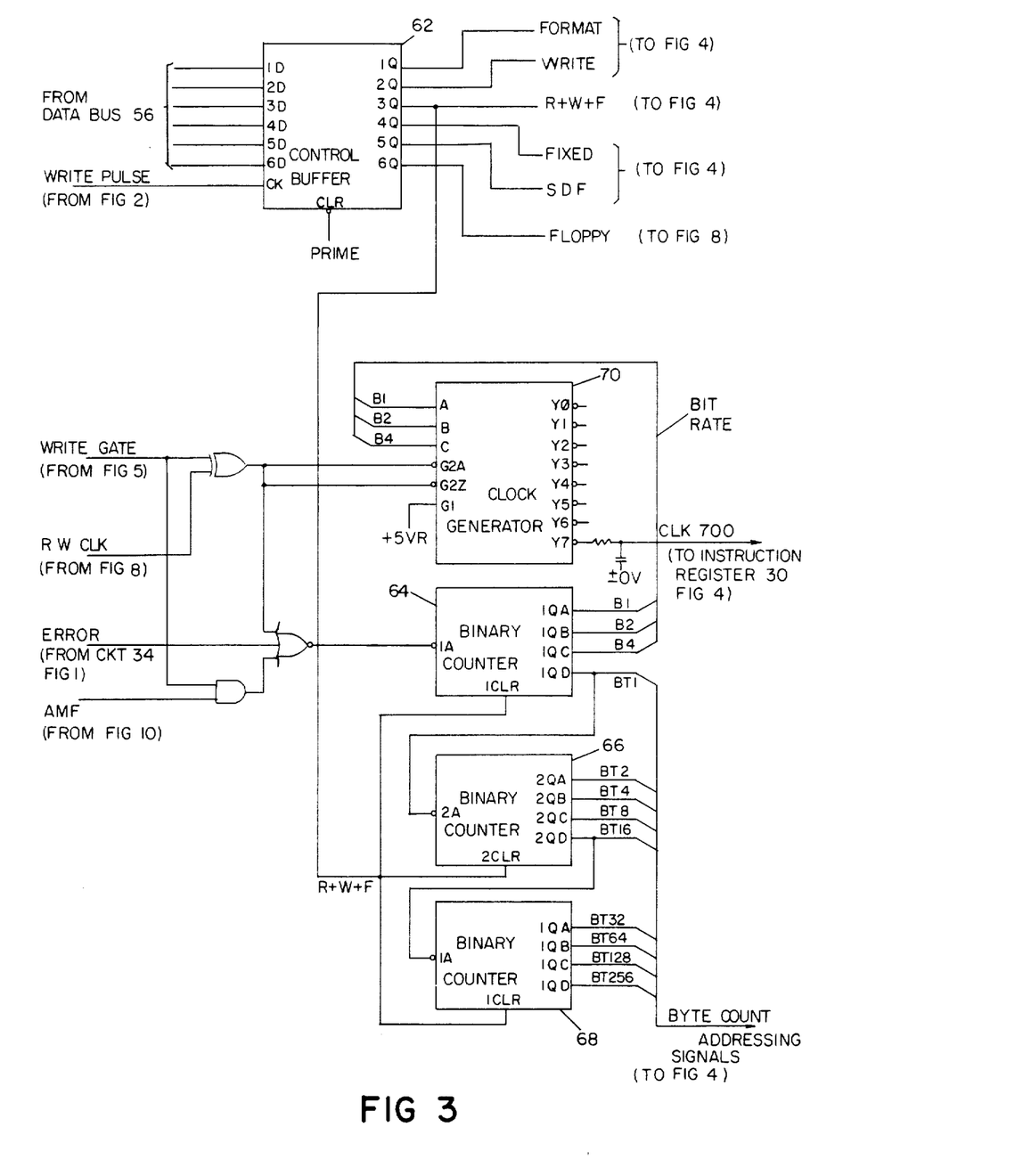
FIG. 3 shows in more detail selection and addressing means of the controller.

Referring now to FIG. 3, the selection and addressing means 26 of controller 20 is shown in more detail. Six lines of data bus 56 are input to control buffer 62, which is clocked by the Write Pulse from circuitry 52 (FIG. 2). The data bus carries control information from the microprocessor circuitry 52 (FIG. 2). The signals output from control buffer 62 are: Format and Write (if both are low, the command is Read); Fixed and SDF (Single Density Floppy) (if both are low, the selection is double density floppy); and R+W+F (Read/Write/Format), which is a "GO" signal. A further signal "Floppy" is provided to the timing means 32, to be described. SDF and DDF (Double Density Floppy) are first and second data storage mode control signals for the floppy disk.

Still referring to FIG. 3, Selection and Addressing Means 26 further provides three binary counters 64, 66, and 68, and a clock generator 70. The binary counters count the input controller timing signals "RWCLK" (Read or Write Clock), which represent the bit rate of the selected peripheral storage unit, and are generated by the timing means (FIG. 8) in a manner to be described. When data is being read from the peripheral storage unit, RWCLK is synchronized to the data being read from the selected disk, in a manner to be described. When data is being written to the peripheral data storage unit, RWCLK is generated from a crystal, selected for the particular storage unit, in a manner to be described.

RWCLK represents the bit rate. Therefore, binary counter 64 counts bits. Its outputs B1, B2, and B4 are input to clock generator 70, which at every eighth bit provides the timing signal CLK 700. At the count B8, counter 64 outputs the the signal BT1 to counter 66. Counters 66 and 68 count further bytes, up to 512 bytes.

Figure 4:
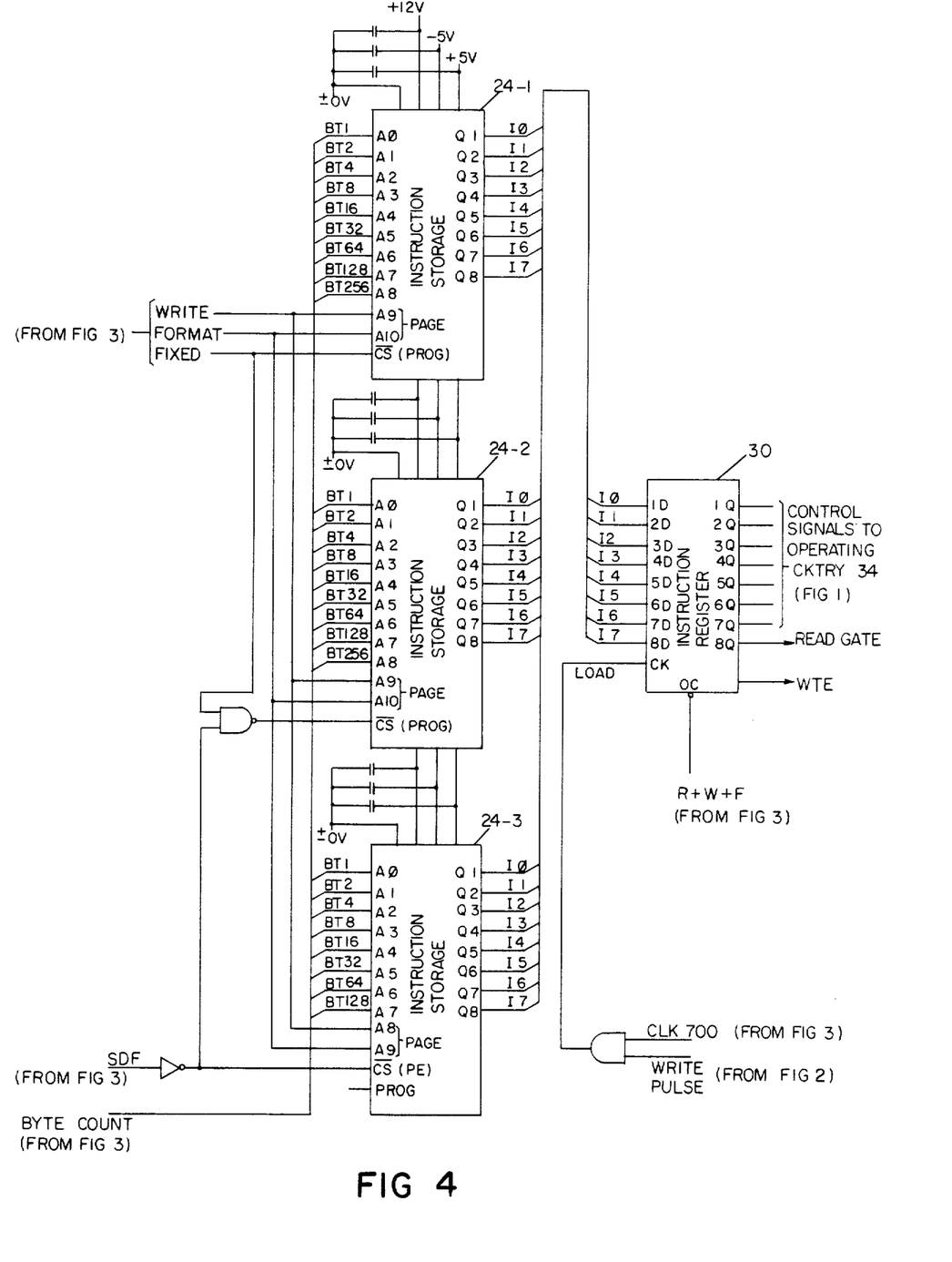
FIG. 4 shows in more detail instruction storage means of the controller.

Referring now to FIG. 4, the instruction storage units 24 are shown. In the particular embodiment described herein, there are three, since there are three peripheral storage units to be controlled: the fixed (Winchester) disk, the floppy disk in single density mode, and the floppy disk in double density mode. However, the invention is not limited to this particular number or choice of peripheral data storage units.

The particular instruction storage units employed in the embodiment described herein are 2516 Series Programmable Logic Arrays, made by Texas Instruments. Motorola 2516 Series PLA's may also be used.

The particular programmable logic array 24 to be accessed is selected by the signal input to CS (Chip Select), which may be Fixed or SDF, from control buffer 62 of FIG. 3. DDF (double density floppy) is selected when Fixed and SDF are both low. The Write and Format signals from buffer 62 (FIG. 3) are applied to high-order address inputs 9 and 10 of units 24-1 and 24-2, and to high-order address inputs 8 and 9 of unit 24-3. These signals select the page within the stored instructions that contains the set of instructions appropriate to the operation. (When both Write and Format are low, the operation is Read.) The remaining address bits are supplied by the byte count outputs of counters 64, 66 and 68 (FIG. 2).

The signals output from the units 24 are applied to instruction register 30. This register is loaded by the signal applied to the "CK" pin, which is the controller timing signal CLK 700 from clock generator 70 (FIG. 2) together with a Write Pulse from circuitry 52 (FIG. 2). Thus at every eighth bit count, a new instruction is loaded into register 30, from the address specified by the byte count and the instructions from buffer 62 (FIG. 3). The R+W+F signal from buffer 62 (FIG. 3) is applied to the output control pin of instruction register 30; thus instruction signals are available from register 30 during read, write and format operations.

The signals output from instruction register 30 are applied directly to the operating hardware 34 (FIG. 1), which in a manner well known in the art controls the operations of the peripheral data storage units.

Figure 5:
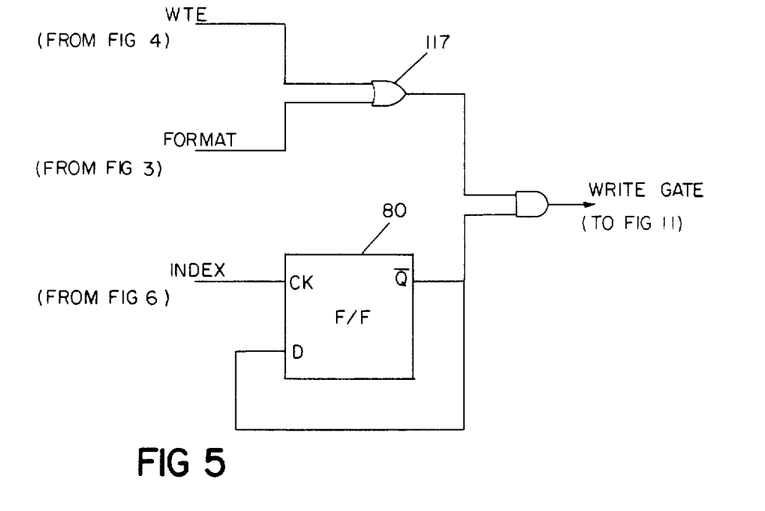
FIG. 5 shows the derivation of a particular internal controller signal.
Figure 9:
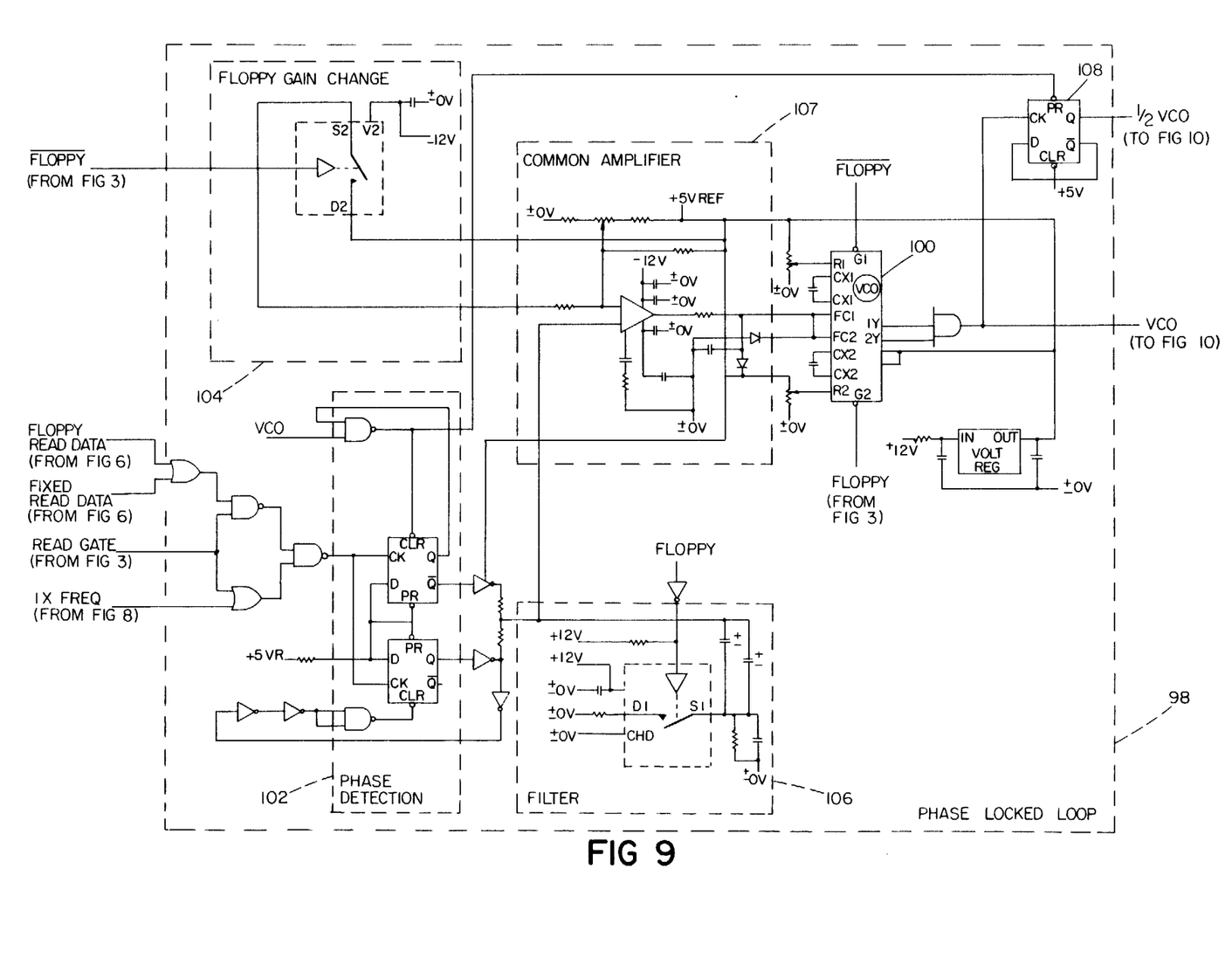
FIG. 9 shows a further portion of the timing means of the controller.
Figure 10:
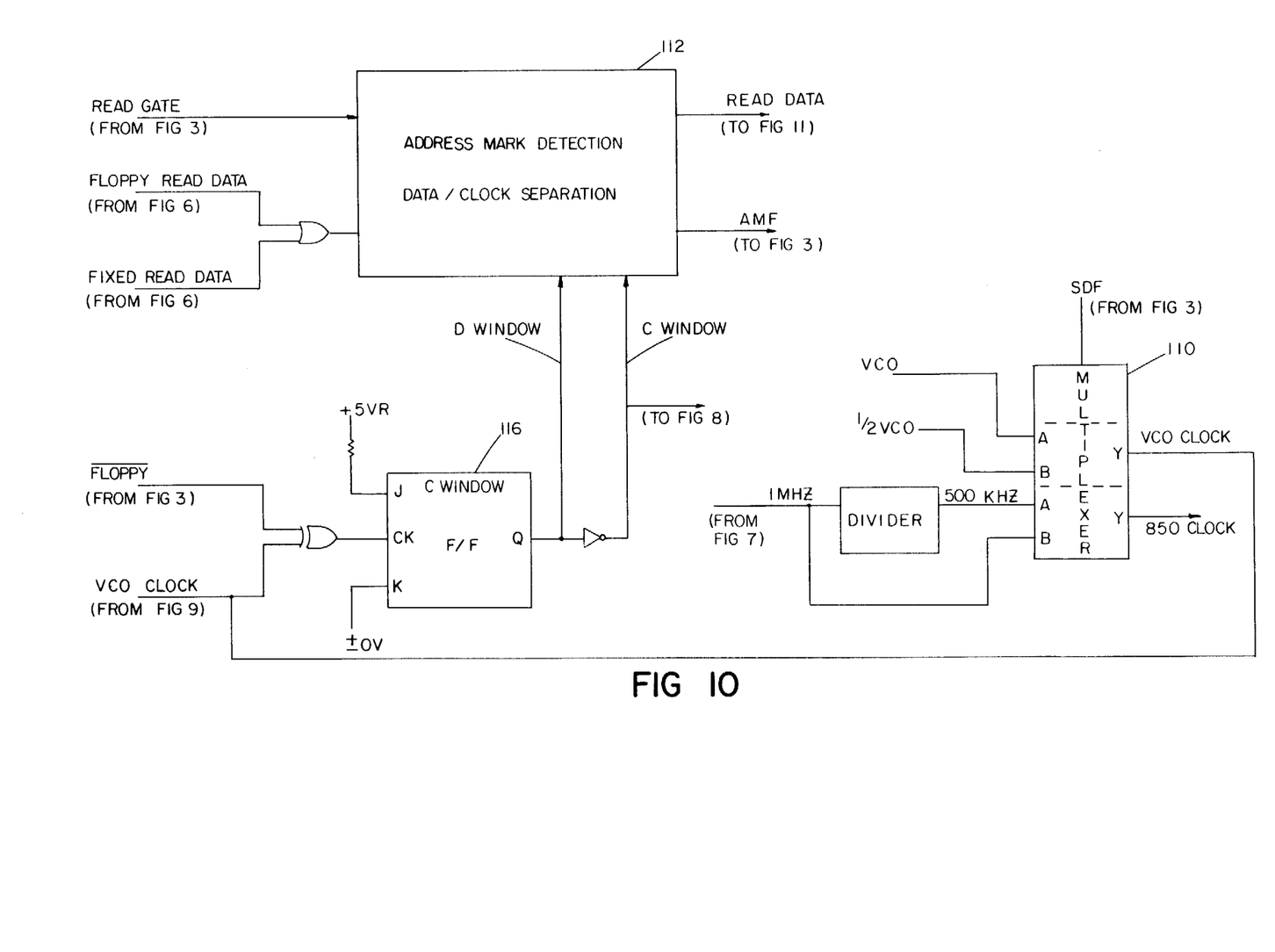
FIG. 10 shows portions of the controller timing means and other controller circuitry.
Figure 11:
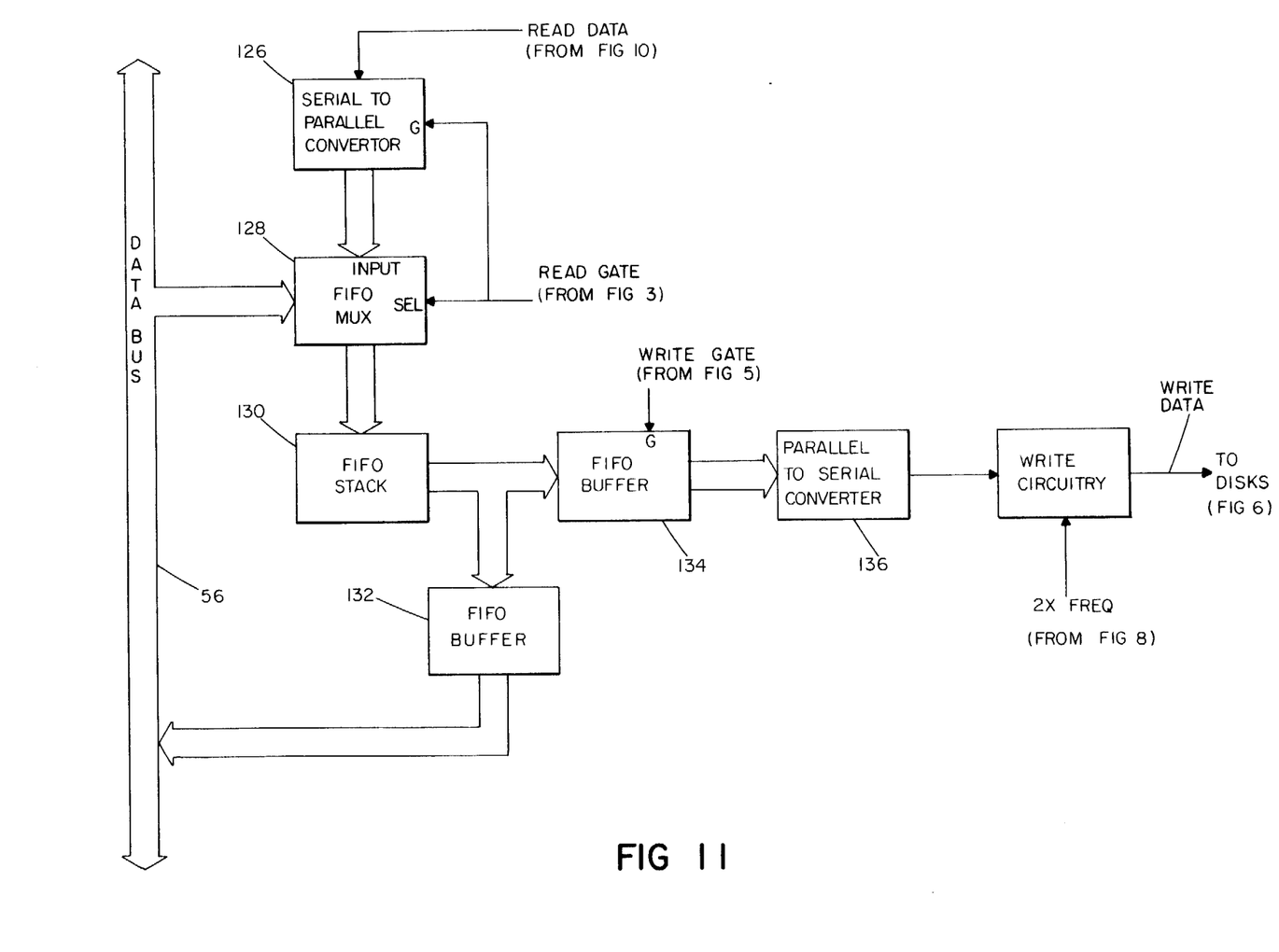
FIG. 11 shows in simplified form controller circuitry associated with transferring data signals between the disks and the controller.
Figure 12:
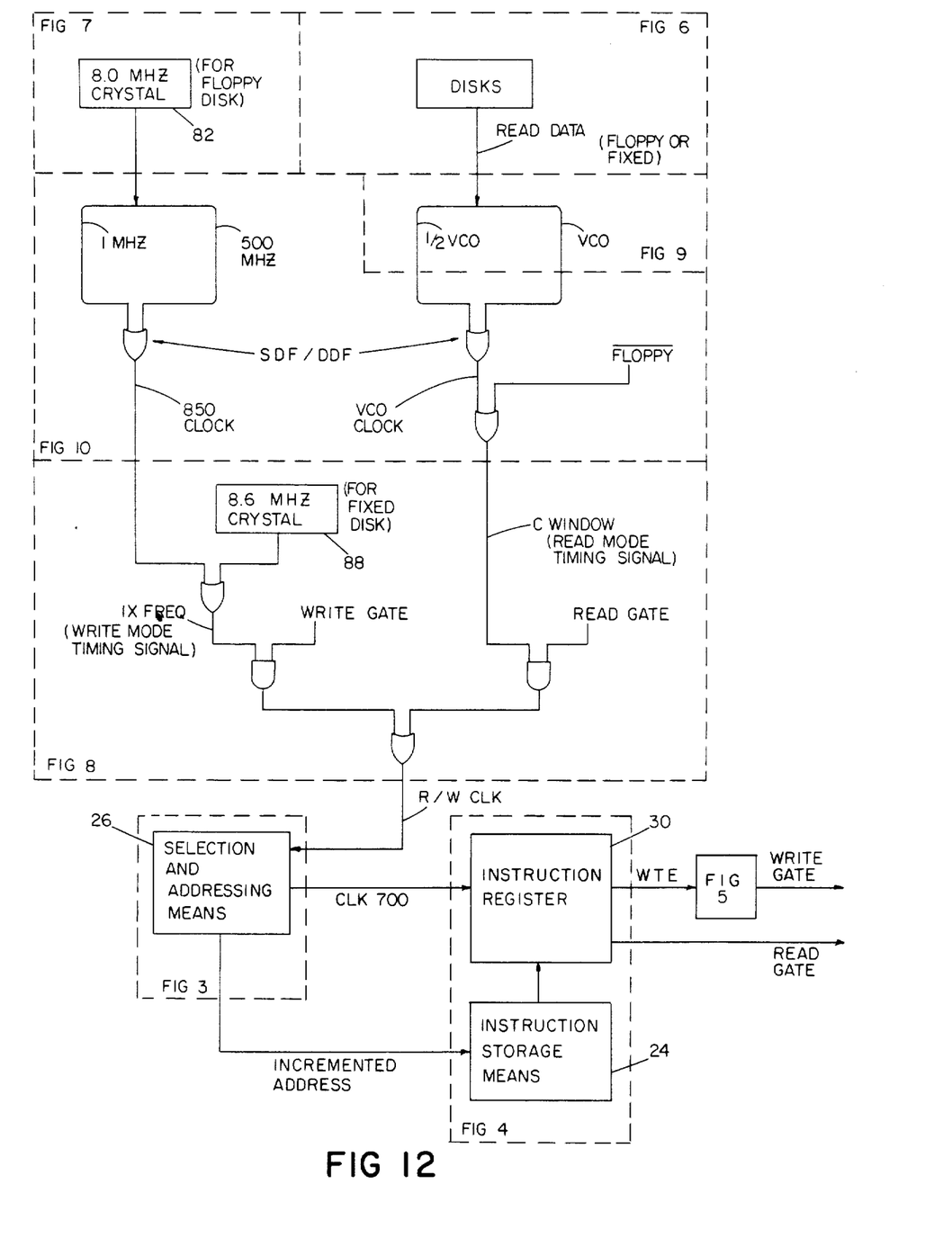
FIG. 12 is a conceptual showing of the derivation of certain signals generated in the controller timing means.

The instruction signals include a Read Gate (read mode) signal which is input to FIGS. 9, 10 and 11, and a WTE (write enable) signal, which is input to FIG. 5. It should be noted that (as is well known in the art of controlling peripheral data storage means) both read mode and write mode occur during a Write operation as controlled by the central processing unit control signals, because address marks and headers must be read before data can be written. Therefore, "read mode" and "write mode" signals are distinct from the CPU Read and Write control signals.

Referring now to FIG. 5, a Write Gate (write mode) signal is generated in response to either (1) a WTE (Write Enable) signal from instruction register 30, FIG. 4, without a Format signal, or (2) a Format signal from control buffer 62, FIG. 3, together with the output of flip flop 80. Flip flop 80 is clocked by the Index signal from FIG. 6.

Referring to FIG. 6, the two disks and associated disk drives of the particular embodiment of the invention described herein are shown. The Index signal (input to FIG. 5) is generated by detection of a physical mark on the disk, providing a position reference. Write Data signals from the Operating Circuitry 34 (FIGS. 1 and 11) are applied to the disk drives; Fixed Read Data and Floppy Read Data signals are received from the disk drives and are input to FIGS. 9 and 10, as will be described.

FIGS. 7, 8, 9 and 10 show portions of the timing means 32 of the controller according to the invention. Before describing these Figures in detail, it will be helpful to consider the conceptual showing of FIG. 12, which shows the relationship of the various significant timing signals and their application to the Selection and Addressing Means 26 of FIG. 3, and Instruction Register 30 of FIG. 4.

Generally, the timing means employs a first timing method when data is being read, and a second timing method when data is being written. When data is being written, a fixed frequency source is employed and bits are written to the disk synchronously with that source. However, because of physical variability in the disks, it is undesirable to employ the signal from the fixed frequency source in receiving data signals from the disk. Bits may be received at times not synchronized with the fixed frequency source. As is well known in the art of reading and writing data storage media, the received data signals must be analyzed in order to detect and distinguish clock bits, headers, address marks, and data bits, and it is therefore necessary that the analyzing circuitry operate synchronously with the received signals themselves.

When data is being read (data in this case includes clock signals, address marks and headers, as well as the actual data of interest) the read data signals are received from the disk (floppy or fixed) (FIG. 6). These read data signals are applied to the phase locked loop circuitry of FIG. 9 to generate signals called VCO (Variable Controlled Oscillator) and ½ VCO. The frequency of VCO will depend on the frequency of received signals, which will be different for the floppy or fixed disk. If the disk is floppy, the choice between VCO and ½ VCO depends on whether single density or double density data storage mode is employed. One or the other of these signals is employed in the circuitry of FIG. 10 to generate a signal called VCO Clock, which is exclusive-OR'd with the Floppy Inverse signal in order to invert the VCO Clock. This is done to adjust for the very much slower speed of the floppy disk, by keeping the VCO clock signal in proper phase.

Figure 8:
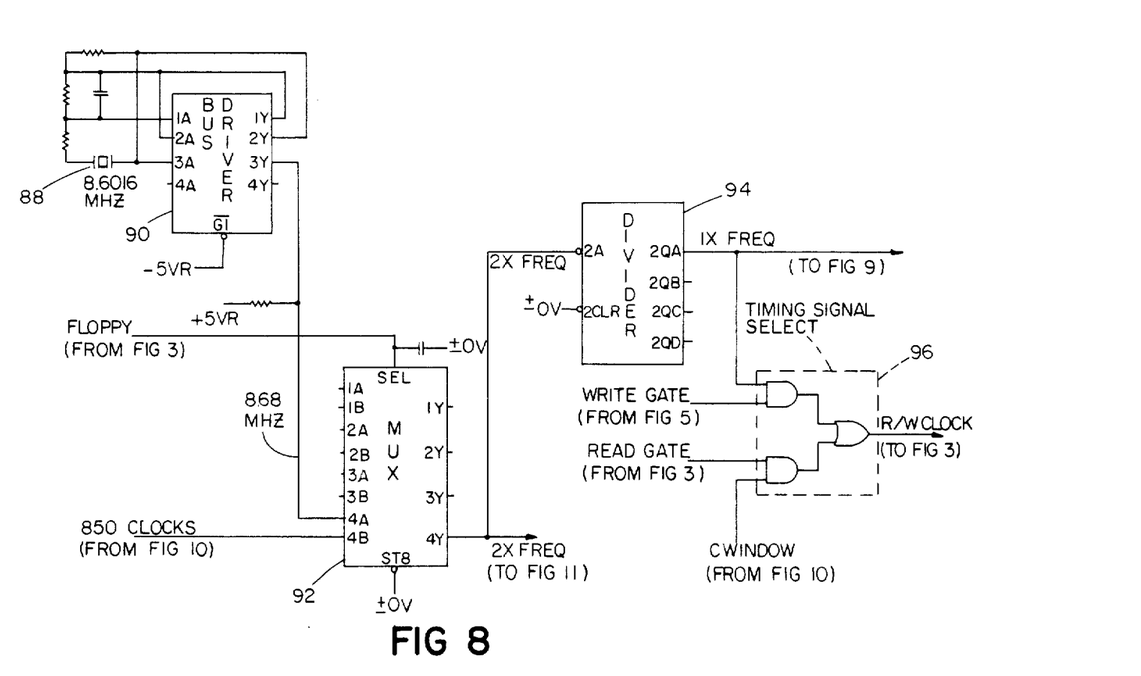
FIG. 8 shows a further portion of the timing means of the controller.

The adjusted VCO Clock signal generates a signal called C window (read mode timing signal), which is applied to the circuitry of FIG. 8. The circuitry of FIGS. 6, 9 and 10 that generates the read mode timing signal C window from the received data signals functions as read mode timing means.

When Read Gate is enabled, C window generates the controller timing signal RWCLK (Read Write Clock), which is applied to the selection and addressing means 26 of FIG. 3 as has been described. After an address mark has been found (FIG. 10, AMF is low), means 26 employs the RWCLK signal to generate the incremented address signals which are applied to instruction storage means 24 to address the successive operating instruction signals, which are output to instruction register 30 (FIG. 4). At the same time, the RWCLK signal is applied to clock generator 70 of FIG. 3, which generates the related controller timing signal CLK 700, which is applied to load instruction register 30. Clock generator 70 is therefore conceptually part of the timing means 32.

When data is being written, the timing signals cannot be derived from data signals coming from the disk. In this case, there are two frequency sources for the timing signal. For a floppy disk, the 8.0 megahertz crystal 82 (FIG. 7) is employed. Its signal is halved by circuitry in FIG. 10 (for single density or double density) and one or the other signal, called 850 Clock, is applied to the circuitry of FIG. 8. For a fixed disk, the 8.6 megahertz crystal 88 (FIG. 8) is employed. Either its output, or the 850 clocks signal, is selected depending on the type of disk, and is designated 1 XFREQ (write mode timing signal). When Write Gate is enabled, the selected 1 XFREQ signal is output from FIG. 8 as RWCLK. The counting means of FIG. 3 begins generating incremented addresses as soon as Write Gate is enabled. The circuitry of FIGS. 7, 8 and 10 that generates the write mode timing signal 1 XFREQ functions as the write mode timing means.

In all cases, the rate of incrementing addresses to the instruction storage means 24, and of loading the contents of those addresses to instruction storage register 30, is responsive to the characteristic data transfer rate of the selected peripheral data storage unit, being determined either by the actual rate of received data signals during read mode operation or by a selected crystal oscillator during write mode operation.

Figure 7:
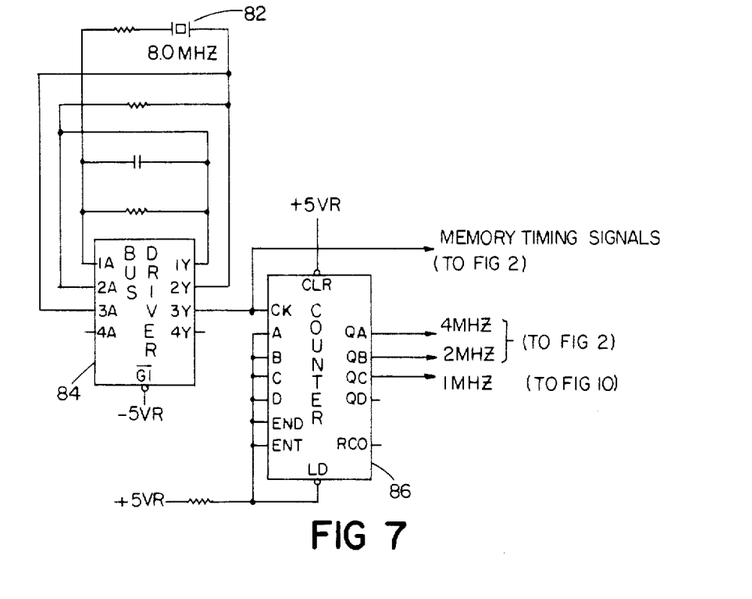
FIG. 7 shows a portion of the timing means of the controller.

Referring now to FIG. 7, a first portion of the Timing Means 32 (FIG. 1) is shown in more detail. This timing circuitry is driven by an 8.0 megahertz crystal 82, whose signal is applied to bus driver 84. The signals output by bus driver 84 are counted by counter 86, which provides three outputs. A 4 megahertz signal and a 2 megahertz signal are applied to the microprocessor and DMA control circuitry 52 (FIG. 2), and are employed in a conventional manner to control their operations. The 1 megahertz signal is applied to the circuitry of FIG. 10, to provide a write timing signal for the floppy disk, as will be described. The signal output by bus driver 84 is also employed as a memory timing signal, and is applied to temporary storage 22 (FIG. 2) where it is used in a conventional manner which will not be described herein.

FIG. 8 shows a further portion of timing means 32. A 8.6016 megahertz crystal 88 provides an output to bus driver 90. The 8.68 megahertz output signal of driver 90 is switched by multiplexer 92 with the "850 clocks" signal, which is derived from the 8.0 megahertz crystal 82 of FIG. 7 and comes from FIG. 10, as will be described. Multiplexer 92 is selected by the Floppy signal, from control buffer 30 (FIG. 3). Thus, for the fixed disk, the signal 2 XFREQ comes from the 8.68 megahertz crystal, while for the floppy disk, the 2 XFREQ signal comes from the "850 clocks" signal.

The 2 XFREQ signal is divided by counter 94. Its output 1 XFREQ is applied to timing signal select circuit 96. At circuit 96, when write Gate (from FIG. 5) is enabled, the signal from divider 94 is output as the signal RWCLK (Read Write Clock), which is applied to the counters and clock generator of FIG. 3, as has been described. When Write Gate is not enabled, but Read Gate (from Instruction Register 30, FIG. 4) is enabled, a signal called C Window (Clock window) is output as the Read Write Clock. The C Window signal is input from FIG. 10 and will be described in connection with that Figure.

FIG. 9 shows the phase locked loop portion 98 of the timing means of the controller, including a Variable Controlled Oscillator 100 whose output is synchronized to the data signals being received from the selected disk. The VCO employed in the preferred embodiment is a type SNS124 dual voltage-controlled oscillator, made by Texas Instruments.

The phase locked loop 98 of FIG. 9 includes a floppy gain change circuit 104, phase detection circuit 102, filter 106, and common amplifier 107. Read data signals, from either the Fixed or Floppy disk (FIG. 6) are input to the phase detection circuit 102, which outputs a voltage which varies in proportion to the difference in input frequency, and when Read Gate is enabled, the output of VCO 100 is constrained to correspond to the rate of data signals being received. When no data signals are being received, the 1 XFREQ input is the standard for the VCO.

The output signal VCO is divided at Flip Flop 108 to provide a signal ½ VCO, which in the case of a floppy disk is used for the single density operation. In the case of a fixed disk, ½ VCO is not used.

The circuitry of FIG. 9 can operate over a very wide range of data transfer rates, and is therefore particularly adaptable to a wide variety of peripheral data units.

Referring now to FIG. 10, the signals VCO and ½ VCO from FIG. 9 are switched by multiplexer 110 (selected by SDF from control buffer 30, FIG. 3) to provide the signal VCO Clock. The 1 megahertz and 500 kilohertz signals are similarly switched by multiplexer 110 to provide the 850 Clock signal, which is input to the circuitry of FIG. 8, as has been described.

The VCO Clock signal and Floppy inverse signal are exclusively OR'd (to insure the correct phase of the VCO Clock signal for the Floppy disk, which is much slower than the fixed disk) and the output is applied to clock the C Window flip flop 116 whose output is C Window (Clock window) or its inverse, D window (Data window).

Circuitry 112 of FIG. 10 performs the controller operations of separating the received signals into clock signals and data signals, and detecting address marks. The particular manner in which these operations are performed is not pertinent to the present invention. Generally, Fixed or Floppy Read Data signals are input to circuitry 112, together with C Window and D Window signals, and when Read Gate is enabled, the clock and data signals received from the disk are separated and the Read Data signals are output to FIG. 11.

FIG. 11 shows generally the means within the operating circuitry 34 for transferring data signals between the peripheral storage units and the temporary storage 22 of controller 20. Read Data signals from the Data Separator circuit 112 (FIG. 10) are applied to a serial to parallel convertor 126. When Read Gate (from instruction register 30, FIG. 3) is high, the data signals from convertor 126 are applied by multiplexer 128 to FIFO stack 130, and are then transferred through FIFO buffer 132 to data bus 56. The data signals are carried on bus 56 to temporary storage 22 (FIG. 2). When Write Gate is high, data signals from bus 56 are switched by multiplexer 128 into FIFO stack 130, and thence to FIFO buffer 134. The parallel data signals are then applied to parallel to serial convertor 136, and are then transferred by the write circuitry portions of operating circuitry 34 to the disks (FIG. 6).

The speed of controller 20 of the invention is limited by the total propagation delay of the counters 64, 66 and 68 (FIG. 3), the instruction storage means 24 (FIG. 4) and the instruction register 30 (FIG. 4). These delays are approximately 40, 100 and 40 nanoseconds, respectively, so that the maximum instruction rate is 5.5 million instructions per second. This rate is sufficient to make it easily possible to control the fastest disks now available, such as the CDC SMD Series, which transfers data at 10 megabits per second. Even faster disks are within the range of operation of the controller of the invention.

To adapt the controller of the invention to control any different plurality of peripheral data storage units, all that is required is to replace (or add to) the instruction storage means 24, and in certain cases, to replace the write frequency crystals 82 and 88. In contrast with many prior art controllers, at least sixteen devices can be controlled by the controller. To adapt the controller to an additional or replacement data storage unit, either a new instruction storage means is added or an existing one is replaced. The construction of a replacement or additional instruction storage means 24 is a simple matter, because the instructions stored therein are executed sequentially by the operating circuitry, there being no decisions or jumps to be provided for. This contrasts with the complexity of the problem of reprogramming a microprocessor in a controller, such as the one described in the connection with the prior art.

What is claimed is:

1. In a data processing system having a central processing unit and a plurality of peripheral data storage units, said peripheral units employing disparate operating control signals and operating at disparate characteristic data signal processing frequencies, said central processing unit providing read, write, format, and storage unit select control signals, a controller connected to said central processing unit and to said peripheral data storage units, and configured to transfer, in response to control signals from said central processing unit, data signals between said central processing unit and any of said peripheral storage units, said controller including     temporary data storage means for holding data signals temporarily, while being transferred between said central processor and any of said peripheral storage units,     means for transferring data signals between said temporary data storage means and any of said peripheral units or said central processing unit,     instruction storage means for storing instructions for read, write, and format operations effecting transfer of data between said temporary storage unit and said peripheral storage units,     selection and addressing means for providing selected address signals to said instruction storage means,     operating circuitry means for providing signals to control said peripheral data storage units,     instruction register means for receiving instructions from said instruction storage means and providing selected input signals to said operating circuitry means,     timing means for providing periodic timing signals controlling the rate of processing of sequential instructions, wherein instructions stored in said instruction storage means are stored in blocks of contiguous addresses, each block containing exclusively the instructions for carrying out a read, write, or format function for a specific peripheral unit, the instructions within each block being stored at addresses in a sequential order corresponding without exception to the temporal order of implementing the instructions for the function and peripheral unit corresponding to the block, said selection and addressing means transmits in response to a signal from said central processor a sequence of address signals to said instruction storage unit beginning with an initial address selected in accordance with said read, write, format, and storage unit select control signals, said initial address being the first address of the block of contiguous addresses relating to the function specified by the read, write, and unit select control signals, and said timing means includes means responsive to said control signals provided by said central processing unit and specifying a particular one of said peripheral units and a particular one of said functions for selecting periodic timing signals repeated at the characteristic rate of operation of any of said peripheral units, said timing signals being applied to increment the current instruction of the instruction register.

2. A controller as claimed in claim 1, wherein said timing means during execution of a read function derives the provided repeating timing signals from the active peripheral unit, and during execution of a write function derives the provided repeating timing signals from a source independent of the active peripheral unit.

3. A controller as claimed in either of claims 1 or 2, wherein said instruction storage means is provided in a plurality of replaceable modules with all instructions relating to a particular peripheral unit stored exclusively in a corresponding module.

* * * * *